Figure 1:
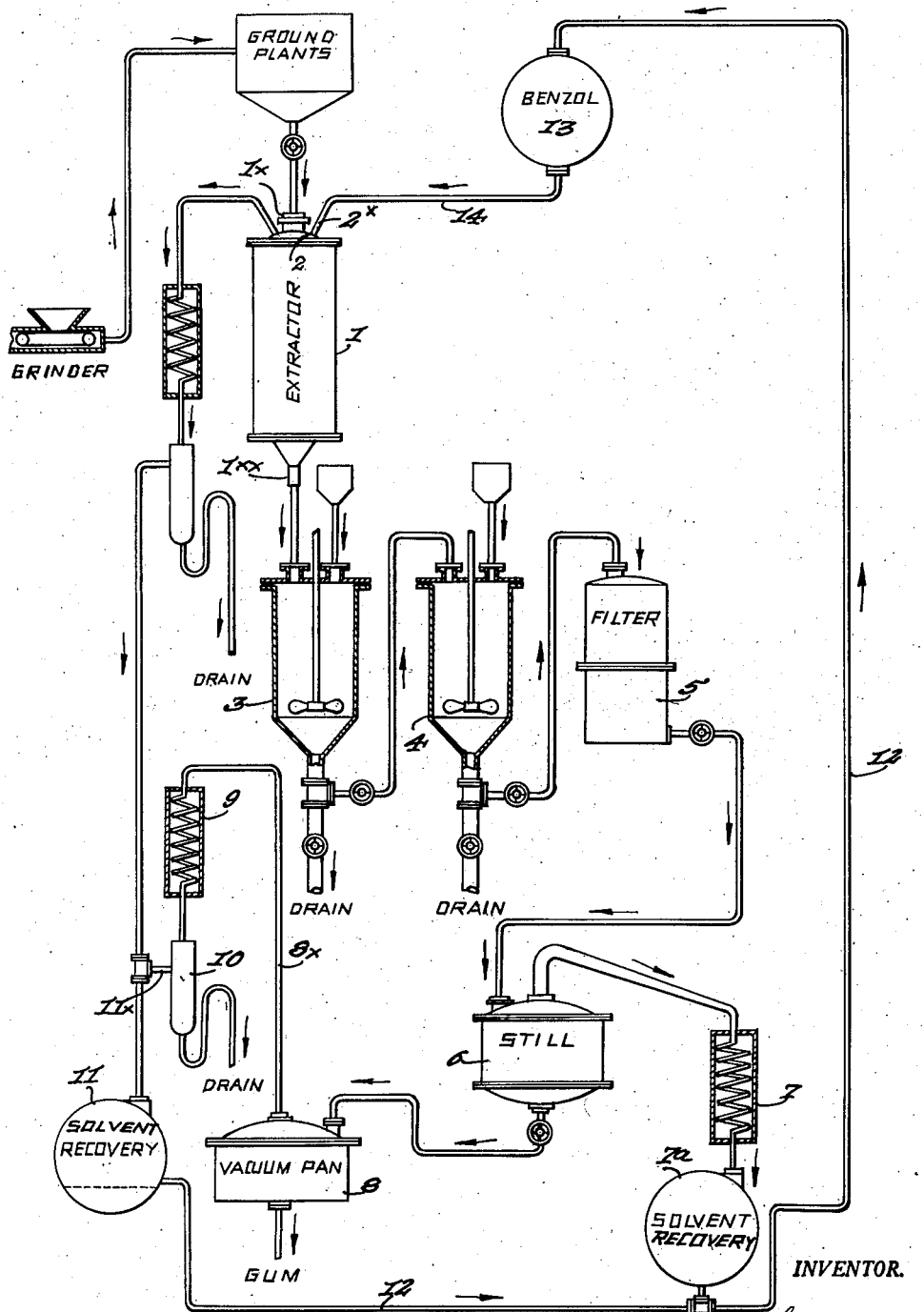

April 2, 1946.   B. N. LOUGOVOY ET AL   2,397,611
PROCESS FOR THE RECOVERY OF GUM CONSTITUENTS
FROM ASCLEPIADACEAE AND PRODUCT
Filed Jan. 13, 1943   2 Sheets-Sheet 2
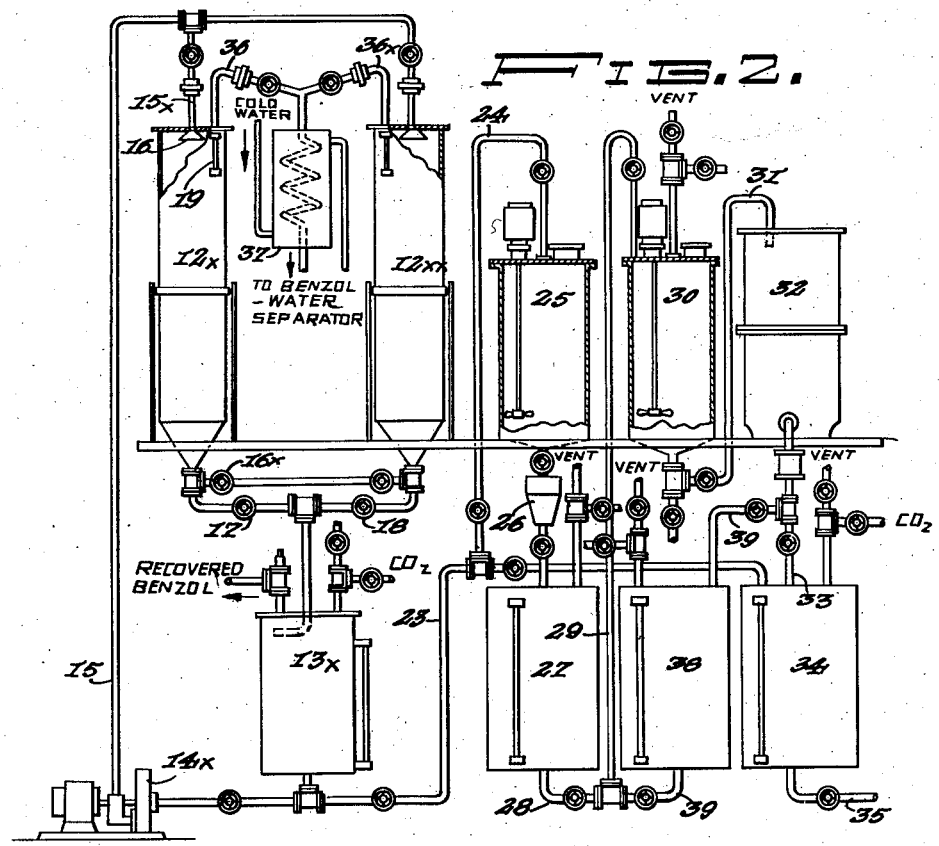
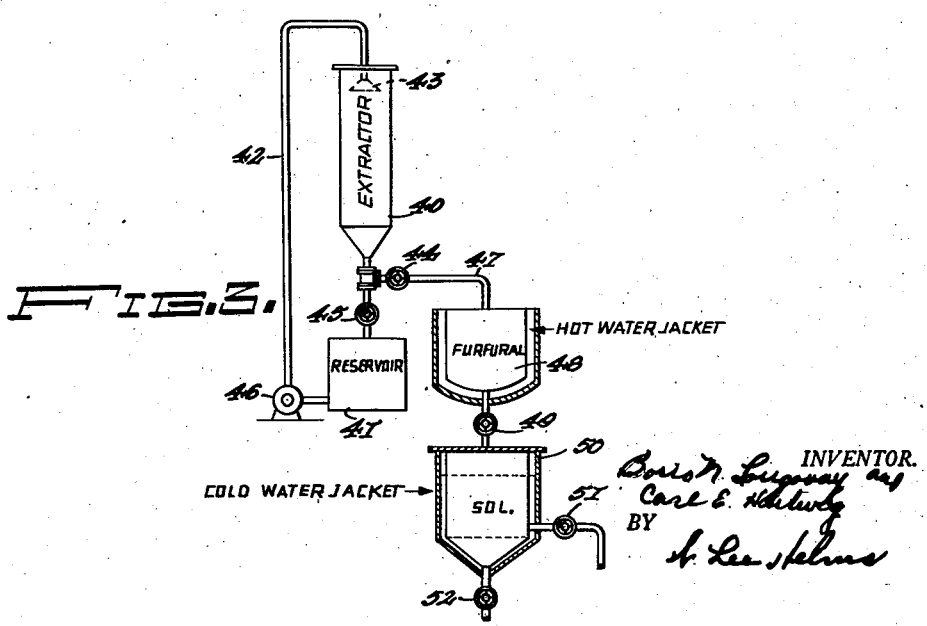

Patented Apr. 2, 1946

2,397,611

UNITED STATES PATENT OFFICE 2,397,611

PROCESS FOR THE RECOVERY OF GUM CONSTITUENTS FROM ASCLEPIADACEAE AND PRODUCT

Boris N. Lougovoy, Jackson Heights, N. Y., and Carl E. Hartwig, Teaneck, N. J.

Application January 13, 1943, Serial No. 472,290

6 Claims. (Cl. 260—817)

The object of the present invention is to provide a process for the recovery of valuable gum constituents of the plants belonging to the Asclepiadaceae family, commonly known as the milkweed, and in one phase of the invention, to obtain a product having physical characteristics similar to chicle in that it will solidify into a block which at room temperatures will snap-break and not be rubbery and flexible.

The present process is based upon a treatment of the dried and ground plant by solvent extraction and other steps of such character as to overcome very difficult problems due to the character of the soluble constituents of the dried plant.

The Asclepiadaceae plants indigenous to the United States, consist of nearly one hundred varieties. The major species growing wild in the eastern part of the United States are Asclepias syriaca and Asclepias sullivanti. These plants reach maturity in early summer, and when full grown vary in height from two to six and one-half feet, with corresponding increase in stem diameter and leaf size. The lactiferous system of the plants consists of branched tubes or canals which extend through the stems, petioles and leaves.

In treating the dried and ground plant material by standard solvent extraction methods and even with thorough liberation of solvent from the recovery, the product is a dark soft viscid and sticky mass, with an objectionable pungent hay-like odor, the material being entirely unsuited for the desired purpose.

Upon our development of a method for substantially removing the coloration constituents, these constituents being primarily chlorophyl, the product remained soft and tacky, possessed poor elasticity and retained its pungent odor. It was then discovered that the odor was due to the presence of a vegetable oil in the product, and that the removal thereof could be effected and that such removal took away a great part of the tackiness, increased the hardness, notwithstanding the fact that the proportion of oil in the plant is very small indeed. It was also found possible to so treat the resulting product that objectionable waxes were removed, this removal being selective, i. e., in such manner that harder and desirable waxes were not affected. Finally, a process was developed, as now to be described, which was certain, effective, and entirely commercial, resulting in a product excellent as a major component of a high grade chewing gum base.

In describing the process, reference will be made to the accompanying drawings which diagrammatically illustrate three forms of suitable apparatus employed, and in which Figure 1 constitutes a flow sheet in apparatus employing an adsorber;

Figure 2 diagrammatically illustrates a duplex apparatus.

Figure 3 diagrammatically illustrates a simplified apparatus.

The apparatus illustrated in Figure 1 consists of an extractor 1 provided with a receiving aperture 1x for the plant particles and with a solvent inlet 2. The extractor is formed with a base discharge outlet 1xx leading to a dehydrator 3, the latter discharging into an adsorber 4. The solution feed from the adsorber leads to a filter 5 discharging into a still 6, the solvent vapors from the still meeting a condenser 7 and the condensate flowing to a solvent vessel 7a.

The solution, substantially solvent free, passes to a vacuum pan 8 from which water vapors and remaining traces of solvent are removed. The vapors are condensed at 9, the water separated at 10, and the liquid solvent led to a solvent vessel 11. The solvent collected in vessels 7a, 11, is re-passed to the extracting vessel via conduit 12, and the intermediate tank 13. The extractor may be fitted with a jacketed solvent intake line, so that the temperature of the solvent can be regulated at any desired temperature. Room temperature of the solvent will generally be sufficient.

In determining the solvent, it was found that the solvents indicated because of their efficiency with respect to the material treated, such as trichlorethylene, hexane and chloroform, so depreciated the finally recovered gum that it was an inferior product, being soft and viscous and not lending itself to purification. The aromatic solvents benzol, toluol and xylol, were found to have no deleterious effect and, in the order stated, to be satisfactory. Also, because of special advantages in the process, as later to be described, V. M. P. solvent naphtha (Standard Oil Co. of New Jersey) is preferred.

The first step in the process is to grind the dried plants into particles which will preferably pass through a 10-mesh screen (SAE gauge). When thus ground the cells of the plant are broken and opened so that the cell contents may be dissolved out. 25 pounds of the dry ground plant particles are placed in the extractor, and thereupon 10 gallons of solvent are circulated for five hours through the particles, a cycle being completed in three minutes. The solution is then led to the dehydrator 3 following which the dehydrated solution is passed to the absorber 4. The reason for dehydrating the solution is that in the preceding extraction after draining the extractor, there remains therein a proportion of solvent held by the drained plain particles. Steam, therefore, is preferably employed to drive off and thus recover such solvent, and this inevitably results in the retention of a minor moisture content within the extractor which is picked up by the subsequent extraction-solution. The presence of even traces of moisture in the solution will interfere with the removal by adsorption of chlorophyl and also will rapidly cause sealing of the filter subsequently used by the adsorbing material employed. The adsorber 4 is one means of effecting our discovery that the highly objectionable chlorophyl may be removed from the solution by selective adsorption. Infusorial earth (such as fuller's earth) or its equivalent, is effective, inasmuch as neither the desired gum constituents nor the waxes are affected. The usual coloration adsorbing materials such as charcoal, activated carbon, aluminum oxide, silica gel, are ineffective because of the peculiar nature of the present solution in which the chlorophyl is contained.

The adsorption material in suitable quantity may be placed in the adsorber and about four pounds of fuller's earth to the solution drained from 25 pounds of ground plant, i. e., 9 gallons, is adequate. Complete adsorption is effected in about forty-five minutes and the contents of the adsorber are constantly stirred.

We have found that the adsorption is more efficiently effected by the addition of adsorption material to the solution in successive relatively small batches. Thus in the use of 4 pounds of adsorption material 2 pounds may be initially placed in the adsorber and the stirring continued for twenty minutes. At this point an additional pound of adsorption material is added and the stirring continued for twelve minutes, at which time the fourth pound is added and the stirring completed in thirteen minutes.

Chlorophyl is removed because of these three objectionable features:

(a) Its deleterious effect on the desired characteristics of the final product in that it acts as an emulsifying agent in the presence of water and tends to break down the gum;

(b) It produces tackiness and softness in the gum; and (c) It provides a fairly permanent coloration, particularly in the presence of water.

If, now, the solution is filtered and the solvent distilled off, the resulting product is pale yellow in color, rather soft and sticky and gradually sets up into a soft friable non-sticky mass, and it has a strong hay-like odor. It contains gutta, resins, waxy materials of mutually different characteristics, a vegetable oil and fatty acids. At this stage it is entirely possible to employ the product for blending in larger proportion with other crude gums, such as Gutta Hang Kang and Perillo Colombian, to provide a major component for a good chewing gum base.

For improvement of the recovered material the solution filtrate from filter 5, after driving off all but a very small proportion of the solvent by means of still 6 is led to the steam still or vacuum pan 8. The function of the last named unit is to remove the pungent oil, small in volume but having a marked effect in producing tackiness, further to remove all traces of the solvent, and, finally, to prepare the gum so that it "sets up" due to the hydrophylic properties of the gum, i. e., its ability to absorb a certain amount of moisture from the steam. In the operation of the steam still or vacuum pan, the pressure may be held at from 5 to 10 pounds of steam until the solvent is completely removed, whereupon the steam pressure may be slowly increased, with care to prevent foaming, until at a pressure of 35 pounds the steam may continue through the mass for one hour, the time of total steam treatment thus may be about one and one-half hours. The oil and water vapor passes upward through conduit $8x$ to condenser 9, accompanied by solvent vapors, and separation is effected by the separator 10, the solvent flowing through discharge pipe $11x$ to the solvent vessel 11, the water being decanted.

It is preferred that in the steam distillation calcium oxide in finely powdered form be placed in the still and in proportion 1/10th of 1% of the calculated gum content, i. e.; if the still has a capacity of 1000 pounds, the calcium oxide will be 1 pound. Calcium oxide has the double function of adding a suitable inert extender and to neutralize any free fatty acids which may be present, the latter being fixed as calcium soap.

After the gum has been steamed, it is withdrawn from the steam still and placed in a heating or drying pan and with slow agitation it is heated until maximum foaming occurs. At this point it is withdrawn from the pan and may be filled in molds and allowed to cool.

A further improvement was effected by the selection of V. M. P. solvent naphtha as the solvent and the use of furfural in a step of the process with the result that the waxes were selectively acted upon with removal of the objectionable softer waxes and retention of the harder and desirable waxes. It was found that the V. M. P. solvent naphtha is a complete solvent for the soluble constituents of the ground plant particles, but dissolves furfural very sparingly, whereas the furfural will effectively act upon the solution as a wash to pick up the soft waxes. This washing step may be effected upon the filtered solution passing from filter 5, whereupon the furfural is separated from the solution and the latter is steamed free from solvent. The final product thus obtained is similar to chicle in physical characteristics. It will solidify into a block which is firm and nonrubbery and nonflexible at room temperatures and which will snap-break. The amount of fatty acids and waxes thus removed has amounted in certain operations to about 4% of the final product.

In the practice of the duplex apparatus, as diagrammatically shown in Figure 2, and with the simplified apparatus of Figure 3, advantage may be taken of the discovery by us that the fibers of the ground plant particles are operative directly to support and retain the adsorption material for adsorbing the chlorophyl and further insuring the discharge of a clear solution. This practice eliminates the necessity for the dehydrator 3, the adsorber 4 and the filter 5.

In practicing the process with the duplex apparatus of Figure 2, extractors $12x$, $12xx$, may be charged with 20 pounds of dry Asclepeiadaceae plants which will be ground, preferably to 10-mesh and intimately mixed with adsorbent material, 4 pounds of fuller's earth being an example. The solvent reservoir $13x$ will be filled with 14 gallons of solvent and the solvent may be pumped by means of pump $14x$ through conduit 15 and branch $15x$ to the spray discharge member 16 within the top of extractor 12x. With valve 16x closed and valve 17 opened (valve 18 being closed) the solvent may be circulated through extractor 12x for five hours with constant stirring and the solvent level may preferably be kept at the central point of sight glass 19 at the top of the extractor.

At the end of the five hours, extractor 12x may be drained into tank 13x, i. e., the solvent reservoir. In practice, it has been found that about 10½ gallons of solution will thus drain off in about thirty minutes, about 3½ gallons being held by the ground plant fibres. The solution, thus freed from chlorophyl, is of pale amber color. The next step is to remove the softer waxes. This soft wax is a yellowish-brown color and somewhat of the consistency of Vaseline at normal room temperatures, as contrasted with the desirable waxes which are firm at room temperatures and range upward in hardness to about that of carnauba wax.

Assuming that V. M. P. solvent has been employed in the extractor, the solution is pumped directly into a tank with an inverted cone base such as that shown at 40 in Figure 3, the tank containing furfural, ¼ pound of furfural to each 5 pounds solution. The temperature of the furfural should be about 50° C. and when the solution meets the furfural a homogeneous mixture results, the latter being passed to a vessel 48 which is provided with a jacket for initially receiving steam at 50° C. and the homogeneous warm mixture then is passed to a decanter diagrammatically shown at 50 and having a conical bottom, the vessel being surrounded by a cooling medium. The furfural with the dissolved-out soft wax is drawn from the base of vessel 50 and the V. M. P. solution is decanted through conduit 51.

The withdrawn solution is then passed to a still for removal of all but traces of the solvent and the substantially solvent-free material still containing the vegetable oil is passed to a steam still or vacuum pan by which the vegetable oil is extracted, the process then being complete.

In the use of the duplex apparatus of Figure 2, employing a separate adsorber and benzol, for example, as the solvent, the ground plant particles in extractors 12x, 12xx, will alternately be subjected to the action of the solvent. The solution passing from extractor 12x to collection tank 13x will then be pumped through conduit 23 and branch conduit 24 to dehydrator 25 which will contain a moisture absorbing medium which as anhydrous sodium sulphate or carbonate and the contents of the dehydrator will be continuously stirred, for fifteen minutes. The moisture-free solution will then be led through a strainer 26 to tank 27. The next step is to blow the dry solution from tank 27 through conduits 28 and 29 to adsorber 30 wherein fuller's earth or its equivalent will be intimately associated with the solution by stirring. The solution is then blown through conduit 31 into vacuum filter 32 which removes the adsorbent. Filtered material is passed through discharge conduit 33 into a collecting vessel 34 from which it may be passed via conduit 35 to a still for removal of the solvent after which the solvent-freed product may be steam stilled for removal of the oil, the fatty acids neutralized by the addition of calcium oxide as hereinabove described.

In the operation of the duplex apparatus, while an extraction step is being performed in extractor 12x, extractor 12xx may be steamed to remove the solvent still held by the ground plant particles, and the reverse is true when extractor 12x is performing its extraction step.

In the case of each extractor during steaming the solvent and moisture vapors pass upwardly to valve controlled conduits 36, 36x, to a condenser 37 and from the condenser to a solvent and water separator.

At 38 an emergency tank is shown which has a valve controlled connection 39 with the filter so that if the filter becomes deranged the solution may be diverted from tank 34 (which leads to the still) and passed into said emergency tank 38 for further treatment. Thus the contents of emergency tank 38 may be blown through valve controlled branch conduit 39 into conduit 29 leading to the adsorber 30 from which it may again be blown to the filter after repair of the latter.

In the employment of our simplified method with the apparatus diagrammatically illustrated in Figure 3, the extractor 40 is charged with the ground plants, for example, 20 pounds, intimately mixed with the adsorption material, for example, 4 pounds, fuller's earth. 14 gallons of V. M. P. solvent naphtha will be placed in tank 41 and by means of pump 46 the solvent will be cycled through the extractor, passing upwards through conduit 42 to the spray head 43 within the extractor. In this operation valve 44 will be closed and valve 45 opened. This recycling may continue for five hours. At this point valve 45 is closed and valve 44 opened and the operation of the pump, indicated at 46, will be continued until the reservoir 41 is empty and the subsequent draining of the extractor through conduit 47 will flow the solution into steam-jacketed mixer 48 charged with ¼ pound furfural for each 5 pounds of the solution. The preferred temperature within the mixer is 50° C. While the solution is being transferred to the mixture, valve 49 will be closed.

The mixing of the solution and furfural takes place rapidly and thereupon valve 49 is opened and the solution drained into separator 50, the latter being provided with a cold water jacket. Valves 51 and 52 will remain closed until the liquid has been cooled and separation effected. Generally three hours is sufficient for the separation. Thereupon, the furfural and the softer waxes brought into solution therein will settle at the conical base of the separator and may be drawn off by opening valve 52, after which valve 52 will be closed, valve 51 opened and the solution drawn off to an initial still for stripping the solution of solvent, whereupon the substantially solvent-free product may be led to a steam still or vacuum pan for stripping off the remaining traces of solvent and freeing the product from the vegetable oil.

Inasmuch as the proportion of softer waxes is not high, the furfural drawn from the separator 50 may be immediately re-used, its small wax content not impairing its efficiency. In fact, the furfural may be re-used several times before stripping it from the wax and employing it in pure form for the separating step.

It thus will be seen that in the operation of our process, a product may be obtained free from chlorophyl and of such substantial improvement over an initial extraction product obtained from the grown plants, as to enable the chlorphyl-free product to be directly used in large proportions for a blending agent with other crude gums, the blended product being suitable for use as a major constituent of chewing gum bases. It will also be seen that an improved product may be obtained by means of a further step in the process, i. e., the removal of vegetable oil. Finally, an excellent gum product having physical characteristics similar to those of chicle, may be obtained by removal of the softer waxes or the fixing of the softer waxes, or the neutralization of the fatty acids, the removal of the softer waxes being preferable.

The phenomenum observed with respect to the selective action of the furfural upon the waxes in that the furfural picks up the softer waxes and does not affect the harder waxes, may be due not only to greater affinity between the furfural and the softer waxes, but to the fact that the gutta content of the solution holds and protects the harder waxes.

The product freed of chlorophyl and vegetable oils, and with removal or fixing of the fatty acids, has the following general composition:

I. General composition in percent total gum:
    a. Gutta_____ 11%
        S. P._____ 116° C.
        Type_____ Caoutchouc, tough, elastic (15° C.)
    b. Total resins_____ 82%
        Av. S. P._____ 65° C.
    c. Non-gutta-resin constituents:
        Sugars_____ None
        Fats and waxes_____ 7%

II. Composition of resins:
    a. Crystalline albans_____ 50%
        Hard, M. P. range____ 140–170° C.
        Chemical type_____ Terpene
        Soft, M. P. range____ 131–133° C.
    b. Fluavils_____ 32%
        M. P. range_____ 40–43° C.
        Chemical type_____ Unsaturated sterols
    c. Waxy albans_____ None S. P. denotes softening point.
M. P. denotes melting point.

By the fixing of fatty acids they are converted into a water-insoluble soap which is firmer than the waxes themselves and does not tend to emulsify in the gum.

It will be noted that the furfural is immiscible with the solution when cold but becomes miscible with it when warm. By "warm" is meant about 50° C. or above.

With regard to the simplified apparatus and, in fact, with respect to the apparatus illustrated in Figure 2, it will be understood that by properly proportioning the tanks and jackets following the extractor, any suitable number of extractors may be employed to increase the output of the apparatus with a minimum number of units.

Our new product may be blended with excellent results with all of the class of materials represented in the chewing gum industry by chicle gelutong, Gutta Hang Kang, Perillo Colombian and other perillos such as Perillo Panama. By the equivalent of these materials is meant those chicle substitutes which are generally used in the industry for preparation of chewing gum bases.

Having described our invention, what we claim and desire to secure by Letters Patent, is as follows:

1. A process for the recovery of gum constituents from Asclepiadaceae plants which comprises: extracting the solubles from the substantially dry comminuted plants by the solvent action of a member of the group consisting of aromatic hydrocarbon solvents and naphtha to form a solution thereof; and removing the chlorophyl from said solution extract by the adsorbtive action of infusorial earth.

2. A process for the recovery of gum constituents from Asclepiadaceae plants which comprises: extracting the solubles from the substantially dry comminuted plants by the solvent action of a member of the group consisting of aromatic hydrocarbon solvents and naphtha to form a solution thereof; removing the chlorophyl from said solution by the adsorbtive action of infusorial earth; substantially stripping the solvent from the solution; and removing the vegetable oil from the residue by steam distillation.

3. A process for the recovery of gum constituents from Asclepiadaceae plants which comprises: extracting the solubles from the substantially dry comminuted plants by the solvent action of a member of the group consisting of aromatic hydrocarbon solvents and naphtha to form a solution thereof; removing the chlorophyl from said solution by the adsorbtive action of infusorial earth; substantially stripping the solvent from the solution; removing the vegetable oil from the residue by steam distillation; and as a step in the process, converting fatty acids carried by said extract into a water insoluble soap.

4. A process for the recovery of gum constituents from Asclepiadaceae plants which comprises: extracting the solubles from the substantially dry comminuted plants by the solvent action of naphtha to form a solution thereof; removing the chlorophyl from said solution by the adsorbtive action of infusorial earth; removing soft waxes from said solution by washing said solution with furfural; and stripping the solvent from the said dewaxed solution.

5. A process for the recovery of gum constituents from Asclepiadaceae plants in accordance with claim 3, in which the solution, which contains chlorophyl, is subjected to the adsorbent material in successive batches of said adsorbent material, each insufficient in itself to completely adsorb the chlorophyl content.

6. A process for the recovery of gum constituents from Asclepiadaceae plants which comprises: extracting the solubles from the substantially dry comminuted plants by the solvent action of naphtha to form a solution thereof; removing the chlorophyl from said solution by the adsorbtive action of infusorial earth; adding furfural to said solution at a temperature sufficient to effect miscibility of furfural and the said solution; reducing the temperature to cause stratification of the furfural thereby to remove softer furfural soluble waxes; removing the furfural layer; and recovering the solubles from the other layer.

BORIS N. LOUGOVOY.
CARL E. HARTWIG.